United States Patent
Layman et al.

[15] 3,655,576
[45] Apr. 11, 1972

[54] PRODUCTION OF CALCIUM HALOPHOSPHATE PHOSPHORS

[72] Inventors: Harry D. Layman, Ulster; Robert E. Taylor, Towanda, both of Pa.

[73] Assignee: Sylvania Electric Products Inc.

[22] Filed: Sept. 8, 1970

[21] Appl. No.: 70,550

[52] U.S. Cl................................252/301.6 P, 252/301.4 P
[51] Int. Cl. ..........................................................C09k 1/36
[58] Field of Search.............................252/301.4 P, 301.6 P

[56] References Cited

UNITED STATES PATENTS

| | | | |
|---|---|---|---|
| 2,904,516 | 9/1959 | Ross et al. ........................252/301.4 P |
| 3,470,106 | 9/1969 | Vodoklys et al..................252/301.4 P |

*Primary Examiner*—Robert D. Edmonds
*Attorney*—Norman J. O'Malley, Donald R. Castle and William H. McNeill

[57] ABSTRACT

An improved process for the production of calcium halophosphate phosphors comprising forming a first substantially uniform admixture of (a) a calcium phosphate source selected from mono and di calcium orthophosphates, calcium pyrophosphates and mixtures thereof, (b) a secondary calcium source having a volatile anion, in stoichiometric proportions to form tricalcium orthophosphate, and (c) the desired sources of dopants, heating the first admixture under temperature and time conditions sufficient to form a doped tricalcium orthophosphate, forming a second uniform admixture, in proper molar ratios, of the doped tricalcium orthophosphates and the calcium halide forming ingredients and heating for a sufficient time and temperature to form a calcium halophosphate phosphor.

7 Claims, No Drawings

PRODUCTION OF CALCIUM HALOPHOSPHATE PHOSPHORS

BACKGROUND OF THE INVENTION

1. Field Of The Invention

This invention relates to calcium halophosphate phosphors. More particularly, it relates to an improved process for producing calcium halophosphate phosphors.

2. Prior Art

Calcium halophosphate phosphors are well known. These phosphors are useful as the luminescent coating inside the envelope of electric discharge lamps and devices. The calcium halophosphate phosphors all generally represented by the formula $3 Ca_3 (PO_4)_2 : 1 Ca X_2$ wherein $Ca X_2$ is a calcium halide such as fluoride or chloride or can be a mixture of calcium fluoride and calcium chloride. The materials are doped with antimony and cadmium and sometimes manganese to obtain the desired color of emission.

These luminescent materials have generally been prepared by heating and admixture of a calcium phosphate source such as monocalcium hydrogen phosphate, a secondary calcium source such as calcium carbonate, the dopant sources, a halide source and a tertiary calcium source. Amounts of the various sources were chosen so to achieve the proper calcium to phosphorus and calcium to halide ratios and the desired amount of various dopants. The compounds used as sources were such that the ions other than those specifically combined to form the calcium halophosphate evolved during heating to elevated temperatures. For example, ammonium halides were used as halide sources and calcium carbonates were used as secondary and tertiary calcium sources. The process produced satisfactory phosphors for many purposes, however, the phosphors were generally produced in trays and the dopant distribution was non-uniform, therefore, phosphors in various portions of the tray varied in dopant concentration. As can be appreciated, the uniformity of the luminosity of a lamp envelope coated with the phosphors varied in relationship to the uniformity of the phosphor. It is believed, therefore, a process that enables the production of a more uniform calcium halophosphate is an advancement in the art.

OBJECTS AND SUMMARY OF THE INVENTION

It is an object of this invention to provide a highly uniform calcium halophosphate phosphor.

It is a further object of this invention to provide a process for the production of uniform calcium halophosphate phosphors.

These and other objects will become apparent to one skilled in the art from the detailed description.

In accordance with one aspect of this invention there is provided a process for producing a calcium halophosphate phosphor having a highly uniform distribution of dopants throughout the phosphor. The process comprises forming a first substantially uniform admixture consisting essentially of a calcium phosphate source selected from the group consisting of monocalcium hydrogen orthophosphate, dicalcium hydrogen orthophosphate, calcium pyrophosphate and mixtures thereof, an antimony source and a cadmium source, an amount of a secondary calcium source containing a volatile anion to yield an overall $(Ca + Mn + Cd + Sb):P$ ratio of about 3:2, heating the admixture at a temperature and for a sufficient time to convert said admixture into an antimony-cadmium doped tricalcium orthophosphate, forming a second admixture consisting essentially of the doped tricalcium orthophosphate, a tertiary calcium source and a halide source, the molar ratio of tricalcium ortho-phosphate to calcium to halide being from about 3:0.9:2 to about 3:1.2:2.5 respectively and heating said second admixture at a temperature and for a sufficient time to convert the admixture into a calcium halophosphate doped with antimony and cadmium.

For a better understanding of the present invention, together with other and further objects, advantages and capabilities thereof, reference is made to the following disclosure and appended claims in connection with the above description of some of the aspects of the invention.

DESCRIPTION OF THE PREFERRED EMBODIMENTS

The calcium phosphate source that are suitable in the practice of this invention are monocalcium hydrogen orthophosphate $CaHOP_4$, calcium dihydrogen orthophosphate, $CA(HPO_4)_2$, calcium pyrophosphate, $CA_2P_2O_7$, and the like. Either anhydrous or hydrates of the foregoing calcium phosphates can be used along with a sufficient amount of a secondary calcium source to convert the phosphates present to tricalcium orthophosphate, $Ca_3(PO_4)_2$. The secondary calcium source can be any calcium compound that contains an anion that will evolve from the admixture during the subsequent heating step, or will decompose to form a volatile compound. Suitable sources include calcium carbonate, calcium hydroxide, calcium nitrate, calcium peroxide, and the like. Of these, calcium carbonate is preferred. A sufficient amount of the secondary calcium source is used to obtain a ratio of $(Ca + Mn + Cd + Sb):P$ of about 3:2 so that doped tricalcium orthophosphate, $Ca_3(PO_4)_2$, can be formed.

The source of the dopants, antimony and cadmium are also added to the blend. Generally, the source of the dopants will be the oxides, however, other sources such as cadmium carbonate, cadmium hydroxide, cadmium phosphate and antimony phosphate can be used. In most instances, from about 0.005 to about 0.05 moles of antimony and cadmium per mole of tricalcium orthophosphate will be used with from about 0.007 to about 0.015 moles of antimony per mole $Ca_3(PO_4)_2$ being especially preferred and from about 0.01 to about .015 moles of cadmium per mole $Ca_3(PO_4)_2$ being especially preferred.

After the first admixture consisting essentially of the foregoing components is prepared, it is heated in an inert atmosphere such as in nitrogen at a temperature of from about 1,200° C. to about 1,250° C. for a sufficient time to form a doped crystalline tricalcium orthophosphate. Generally about 1 to about 6 hours are sufficient to form the crystalline material. Analysis of samples of the material can be used to determine the actual time required in the particular furnace system used.

After the doped crystalline tricalcium orthophosphate is formed, a second admixture is formed consisting essentially of the doped tricalcium orthophosphate, and a tertiary calcium source and a halide source in ratios to yield about 0.8 to about 1.2 mole of calcium halide per mole of tricalcium orthophosphate. The preferred halides are a mixture of chloride and fluorides. The calcium source and halide source can be the appropriate calcium halide or be mixtures of individual calcium sources and halide source. For example, calcium fluoride, ammonium chloride and calcium carbonate in proper ratios can be used to produce a desirable calcium halophosphate or a calcium fluoride and calcium chloride blend can be used to provide the sources of calcium and halide. If a calcium fluoride-calcium chloride mixture is desired generally the ratio of F:Cl is from about 3.5:1 to about 4.5:1. If a tertiary calcium source other than the appropriate calcium halide is used it can be selected from the same group as the secondary calcium source and a Ca:halide ratio of 1:2 is used. Additionally, the secondary and tertiary calcium sources can be the same or different compounds. After the second substantially uniform admixture is prepared by blending using conventional solids blending equipment the admixture is heated to a temperature of from about 1140° C. to about 1180° C. for at least about 2 hours and preferably about 6 hours to form the calcium halophosphate.

To more fully illustrate the invention the following detailed examples are presented. All parts, proportions and percentages are by weight unless otherwise indicated.

EXAMPLE 1

A uniform blend of the following components are prepared:

| | Weight | Molar Equivalent Amounts |
|---|---|---|
| $CaHPO_4$ | 2764.2 grams | 3.00 |
| $CaCO_3$ | 827.3 grams | 1.21 |
| $MnCO_3$ | 69.7 grams | 0.09 |
| $Sb_2O_3$ | 79.2 grams | 0.04 |
| CdO | 52.1 grams | 0.06 |
| $CaF_2$ | 227.5 grams | 0.43 |
| $NH_4Cl$ | 65.0 grams | 0.18 |

The blend is heated in trays in an inert atmosphere of nitrogen in a furnace for about 3 hours at 1150° C. to form a conventional calcium halophosphate, doped with manganese, antimony and cadmium. Three samples designated as I–A, I–B and I–C are taken from the trays at the top, middle and bottom respectively.

A uniform blend of the following components is prepared:

| | Weight | Molar Equivalent |
|---|---|---|
| $CaHPO_4$ | 3053.1 grams | 2.0 |
| $CaCO_3$ | 888.5 grams | 0.8 |
| $MnCO_3$ | 86.6 grams | 0.0633 |
| $Sb_2O_3$ | 80.9 grams | 0.025 |
| CdO | 48.4 grams | 0.034 |

The uniform blend is heated in an inert atmosphere of nitrogen in a furnace at a temperature of about 1,200° C. for about 4 hours. A crystalline tricalcium orthophosphate is formed.

A second uniform blend of the following components is prepared.

| | Weight | Molar Equivalent |
|---|---|---|
| Doped $Ca_3(PO_4)_2$ From 1st blend | 3780.0 grams | 3.00 |
| $CaF_2$ | 279.8 grams | 0.865 |
| $NH_4Cl$ | 100.5 grams | 0.475 |
| $CaCO_3$ | 96.7 grams | 0.238 |

The foregoing blend is heated in trays in an inert atmosphere of nitrogen in a furnace at about 1150° C. for about 4 hours to form a calcium halophosphate. Samples designated as II–A, II–B and II–C are taken from the top, middle and bottom of the trays respectively.

Analysis of the samples indicate the following results in Table 1.

TABLE 1

| | | I-A | I-B | I-C |
|---|---|---|---|---|
| | % Cd | 1.20 | 0.68 | 0.64 |
| | % Sb | 0.73 | 0.91 | 0.92 |
| II-A | | | II-B | II-C |
| | % Cd | 1.27 | 1.28 | 1.27 |
| | % Sb | 1.02 | 0.99 | 0.98 |

As can be seen from the above data the process of the present invention yields a product that is uniform throughout since essentially change in Cd or Sb content is evident.

EXAMPLE II

Following essentially the same procedure as in Example I a series of halophosphate phosphors are prepared. Samples designated as 1 to 5 are from phosphors prepared using the prior art one step firing method. Samples designated 6–10 are from phosphors using the process of this invention as illustrated in Example 1. Fluorescent lamps made using foregoing 10 samples of phosphor are tested for brightness. The following data is obtained and given in Table 2.

TABLE 2

Brightness In Lumens For 40 Watt Fluorescent Lamps

| Sample | | Sample | |
|---|---|---|---|
| 1 | 3194 | 6 | 3247 |
| 2 | 3180 | 7 | 3220 |
| 3 | 3185 | 8 | 3231 |
| 4 | 3190 | 9 | 3258 |
| 5 | 3159 | 10 | 3261 |

In each instance, it is shown that the phosphors produced by the process of this invention have a higher brightness than the materials produced by the prior art methods.

While there has been shown and described what are at present considered the preferred embodiments of the invention, it will be obvious to those skilled in the art that various changes and modifications may be made therein without departing from the scope of the invention as defined by the appended claims.

What claimed is: claimed:

1. A process for producing a calcium halophosphate phosphor comprising:
   a. forming a first substantially uniform admixture consisting essentially of a calcium phosphate source selected from the group consisting of monocalcium hydrogen orthophosphate, dicalcium hydrogen orthophosphate, calcium pyrophosphate and mixtures thereof, a sufficient amount of secondary calcium source containing a volatile anion, an antimony source and a cadmium course, to obtain a $(Ca + Cd + Sb):PO_4$ ratio of about 3:2 in said admixture,
   b. heating said first admixture in a substantially inert atmosphere to a temperature of from about 1200° C. to about 1250° C. for at least about 60 minutes to form a doped tricalcium ortho-phosphate composition consisting essentially of tricalcium ortho-phosphate doped with antimony and cadmium,
   c. forming a second substantially uniform admixture consisting essentially of said doped tricalcium orthophosphate composition, a tertiary calcium source and a halide source wherein the ratio of tricalcium orthophosphate to calcium to halide is from about 3:0.9:2.0 to about 3:1.2:2.5, respectively, and
   d. heating said second admixture to a temperature of from about 1140° C. to about 1180° C. for at least about 2 hours to form a calcium halophosphate phosphor.

2. A process according to claim 1 wherein said halide is a mixture of fluoride and chloride.

3. A process according to claim 2 wherein in said first admixture a manganese source is present.

4. A process according to claim 2 wherein in said second admixture a manganese source is present.

5. A process according to claim 2 wherein the ratio of tricalcium orthophosphate to calcium halide is from about 2.8:1 to about 3.0:1.

6. A process according to claim 5 wherein said calcium phosphate source is $CaHOP_4$.

7. A process according to claim 6 wherein said secondary calcium source is calcium carbonate.

* * * * * rO-1050
(5/69)

UNITED STATES PATENT OFFICE
CERTIFICATE OF CORRECTION

Patent No. 3,655,576  Dated April 11, 1972

Inventor(s) Harry D. Layman and Robert E. Taylor

It is certified that error appears in the above-identified patent and that said Letters Patent are hereby corrected as shown below:

Col. 2, Line 8 - "$CaHOP_4$" - should read - "$CaHPO_4$"

Col. 4, Claim 6, line 2 - "$CaHOP_4$" should read - "$CaHPO_4$"

Signed and sealed this 29th day of August 1972.

(SEAL)
Attest:

EDWARD M. FLETCHER, JR.      ROBERT GOTTSCHALK
Attesting Officer            Commissioner of Patents